March 25, 1941.  W. A. HERRMANN  2,236,369

MACHINE FOR STITCHING A SHEATHING ABOUT A RING

Filed March 28, 1940  6 Sheets-Sheet 1

Inventor:
Walter A. Herrmann
By Chritton, Wiles, Davies, Hirschl & Dawson
Attorneys.

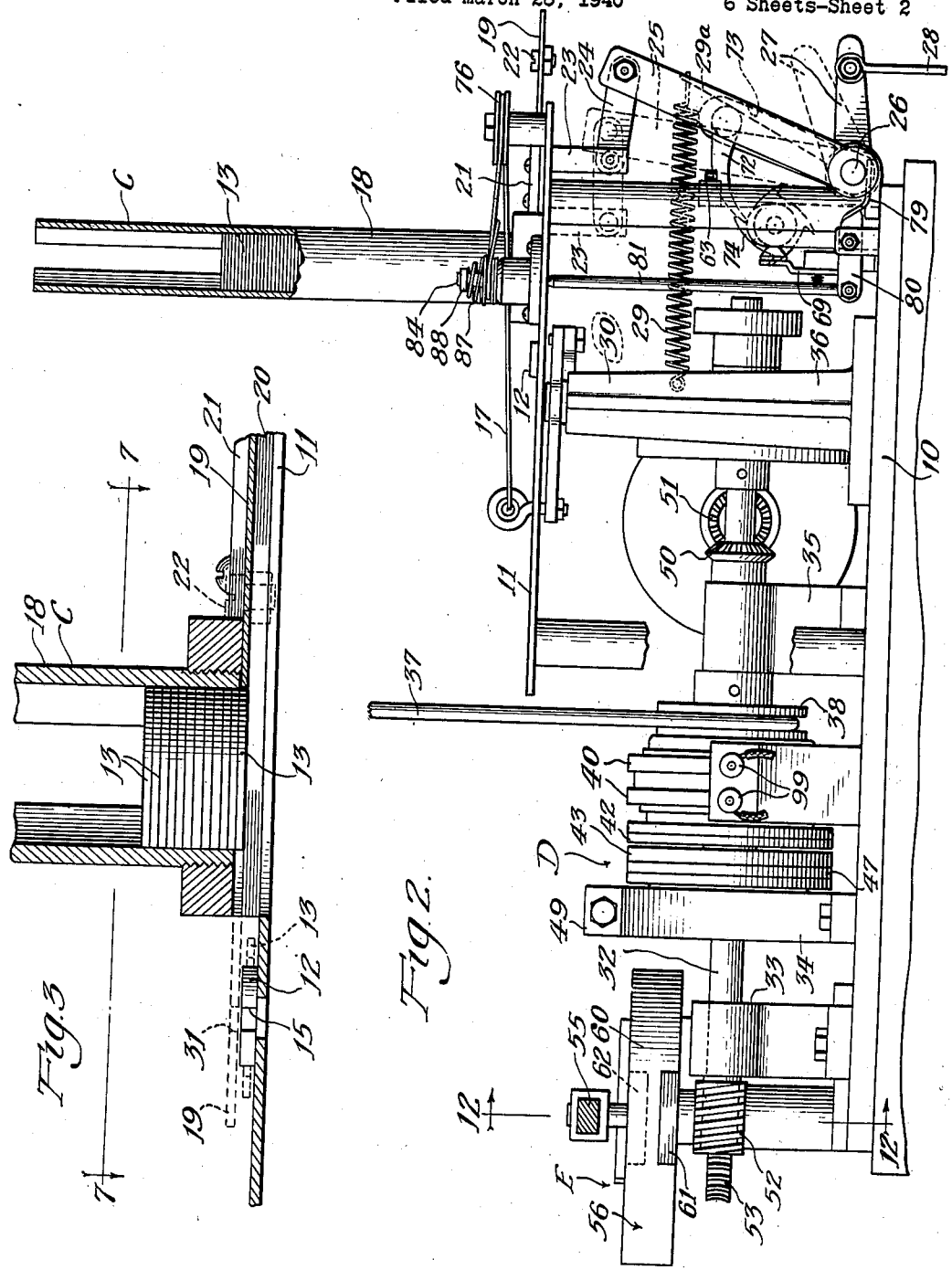

March 25, 1941.  W. A. HERRMANN  2,236,369
MACHINE FOR STITCHING A SHEATHING ABOUT A RING
Filed March 28, 1940      6 Sheets-Sheet 3

Inventor:
Walter A. Herrmann
By Chritton, Wiles, Davies, Hirsch & Dawson
Attorneys.

March 25, 1941.　　　W. A. HERRMANN　　　2,236,369
MACHINE FOR STITCHING A SHEATHING ABOUT A RING
Filed March 28, 1940　　　6 Sheets-Sheet 4

Inventor:
Walter A. Herrmann
By Chritton, Wiles, Davies, Hirschl & Dawson
Attorneys.

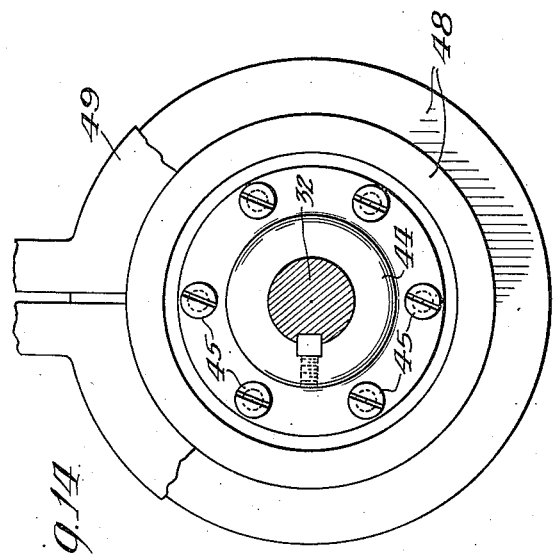
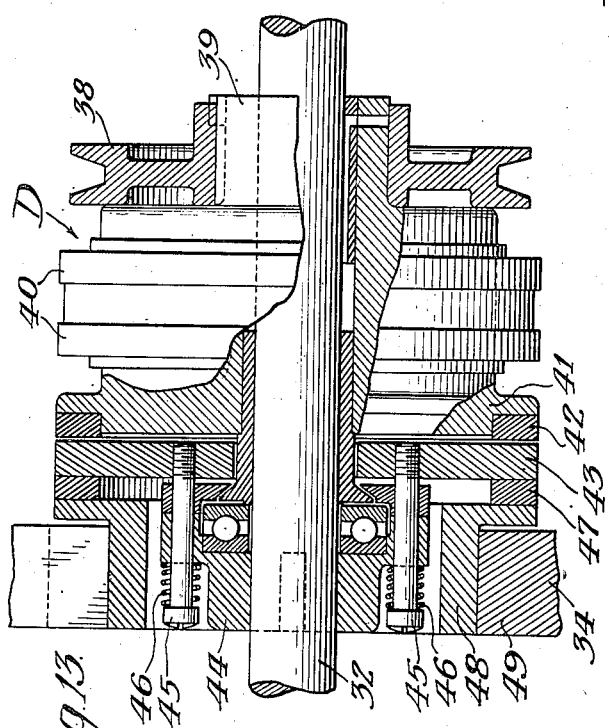

Patented Mar. 25, 1941

2,236,369

UNITED STATES PATENT OFFICE 2,236,369

MACHINE FOR STITCHING A SHEATHING ABOUT A RING

Walter A. Herrmann, Chicago, Ill., assignor to E. L. Mansure Company, Chicago, Ill., a corporation of Illinois Application March 28, 1940, Serial No. 326,516

14 Claims. (Cl. 66—1)

This invention relates to a machine for stitching or crocheting a sheathing about a ring, such as, for example, a curtain ring.

An object of the invention is to provide substantially automatic mechanism for feeding a ring into position, crocheting a sheathing around the same, and then automatically stopping the crocheting operation after the sheathing is complete. A further object is to provide means operated by a single treadle movement for feeding a ring from a reservoir into position, stitching a covering for the ring, and then automatically stopping the operation after the stitching is finished. Other specific objects and advantages will appear as the specification proceeds.

The invention is illustrated, in a preferred embodiment, by the accompanying drawings, in which—

Figure 1:
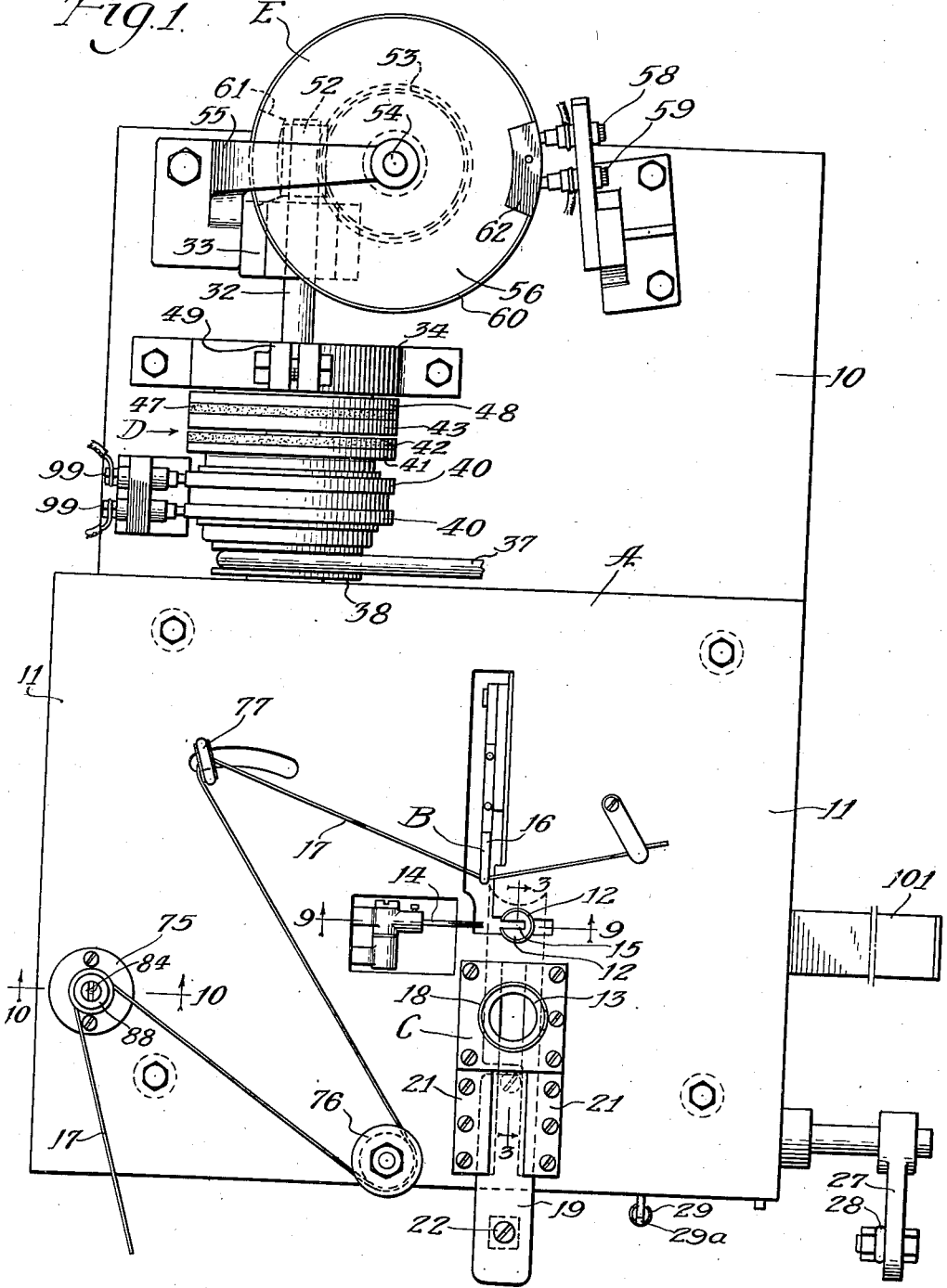
Figure 4:
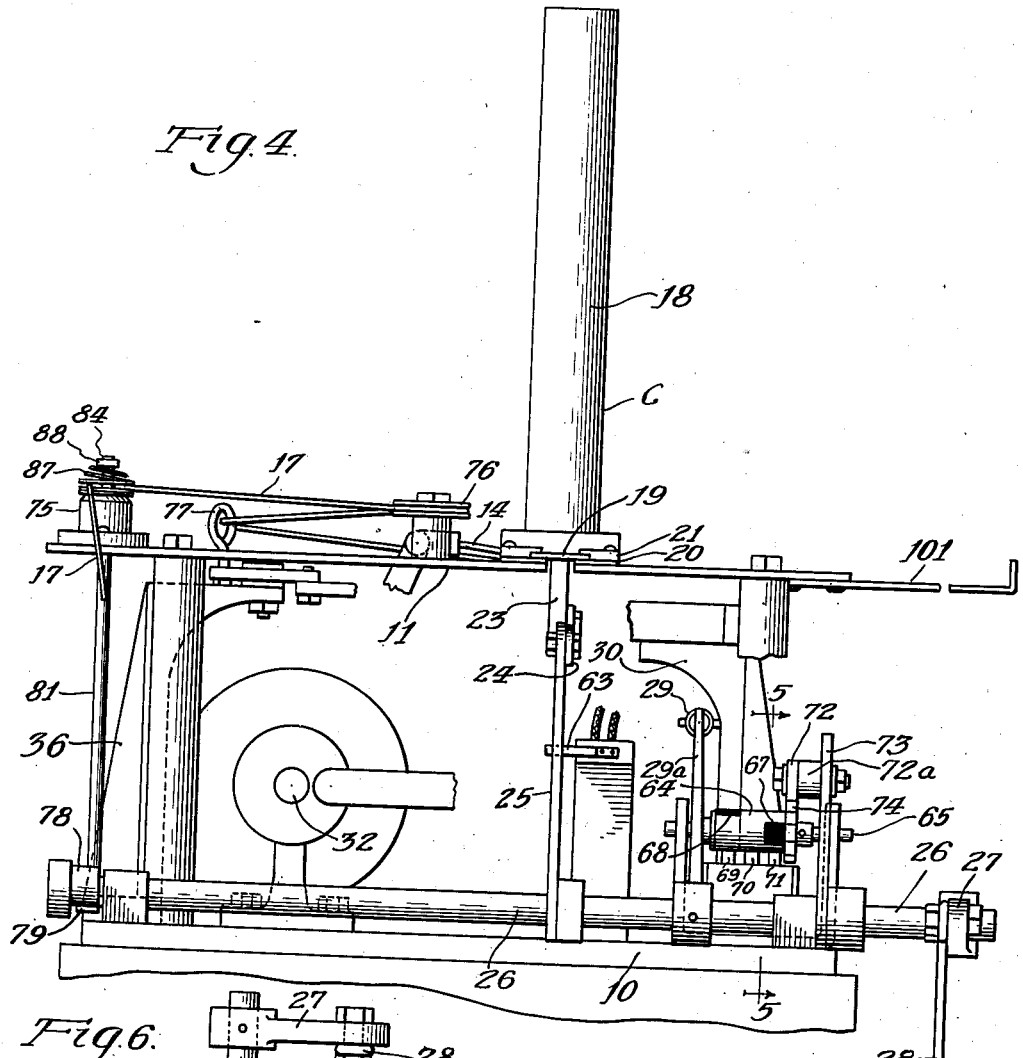
Figures 5, 6:
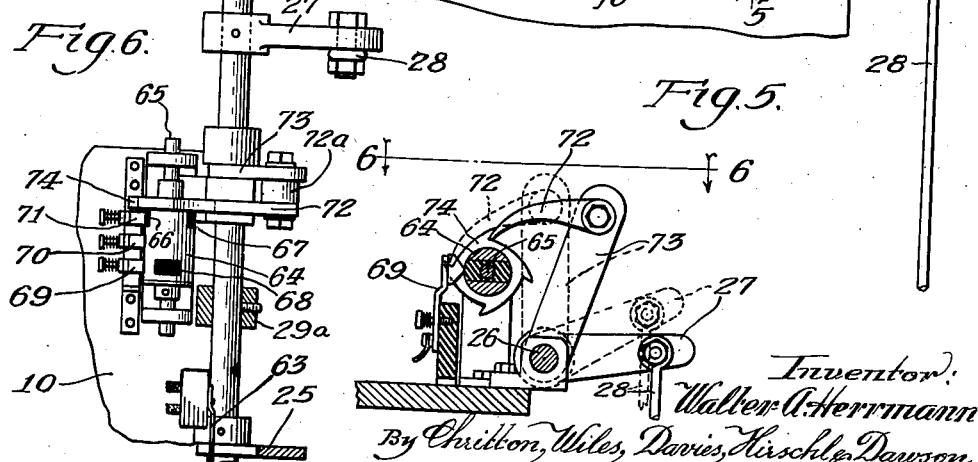
Figure 7:
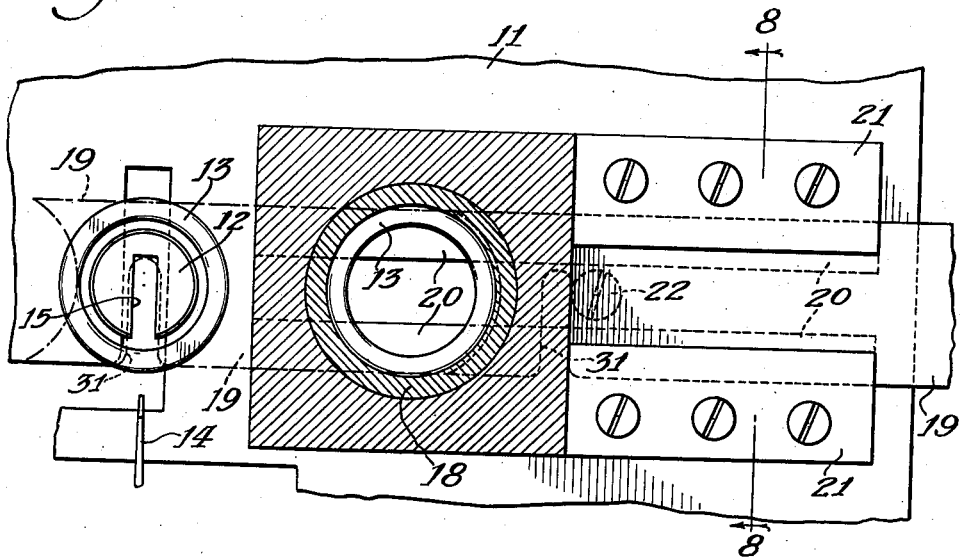
Figure 16:
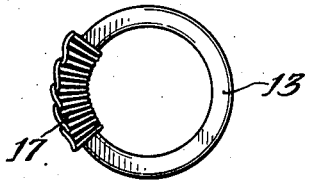
Figure 8:
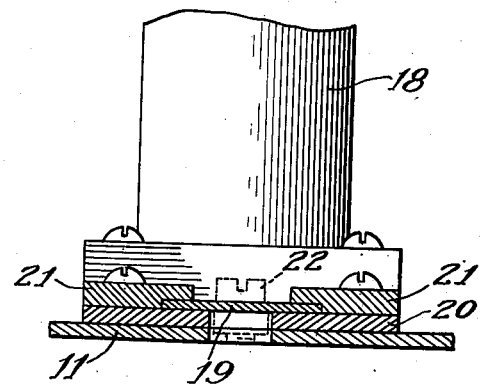
Figure 9:
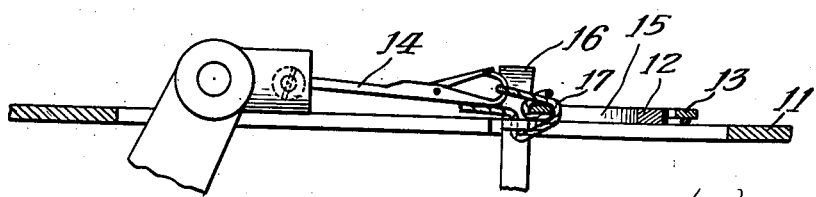
Figure 10:
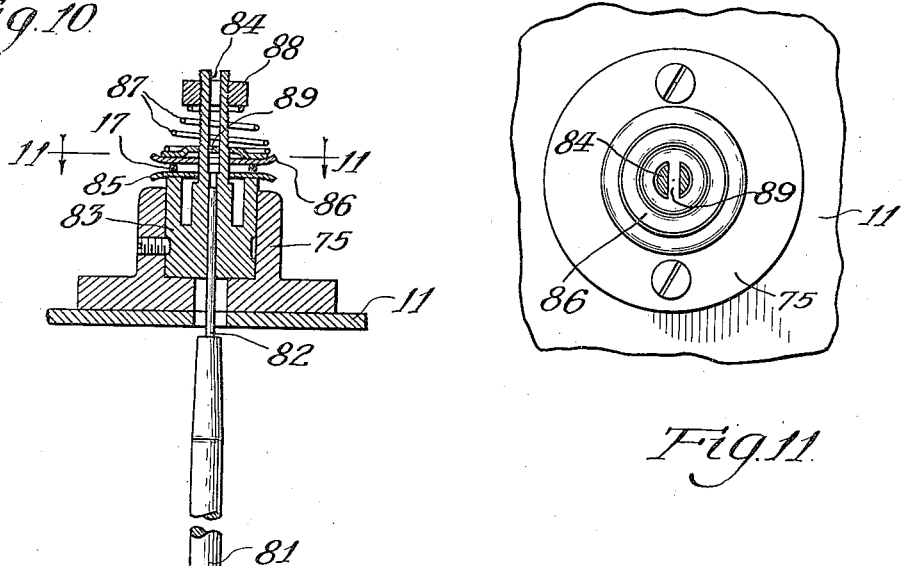
Figure 11:
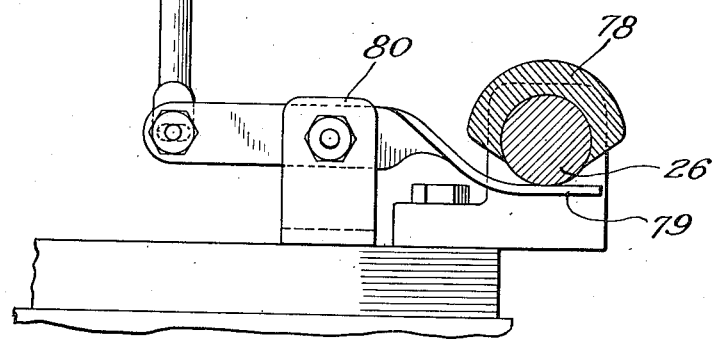
Figure 12:
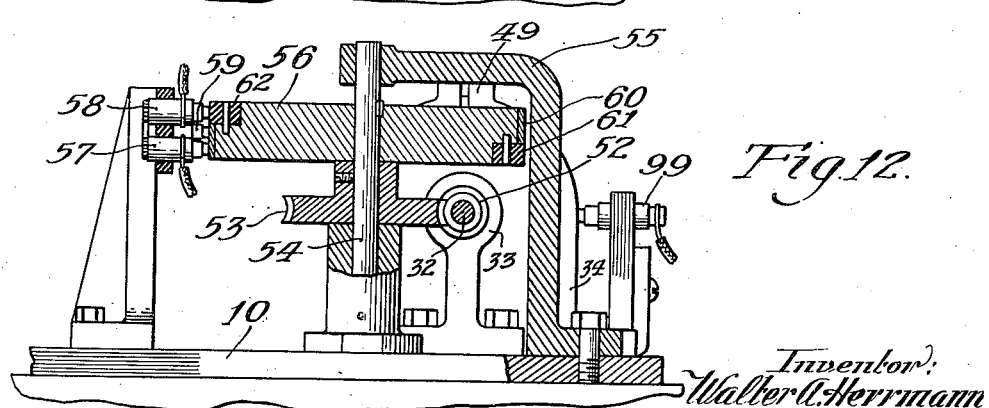

Figure 1 is a plan view of apparatus embodying my invention; Fig. 2, a side view in elevation; Fig. 3, an enlarged sectional view of the ring reservoir and mechanism for feeding rings therefrom; Fig. 4, a rear view in elevation of the mechanism; Fig. 5, an enlarged detail sectional view, the section being taken as indicated at line 5 of Fig. 4; Fig. 6, a plan sectional view, the view being taken as indicated at line 6 of Fig. 5; Fig. 7, a plan sectional view, the section being taken as indicated at line 7 of Fig. 3; Fig. 8, a transverse sectional view, the section being taken as indicated at line 8 of Fig. 7; Fig. 9, an enlarged broken sectional view, the section being taken as indicated at line 9 of Fig. 1; Fig. 10, a longitudinal sectional view, the section being taken as indicated at line 10 of Fig. 1; Fig. 11, a transverse sectional view, the section being taken as indicated at line 11 of Fig. 10; Fig. 12, an enlarged vertical sectional view, the section being taken as indicated at line 12 of Fig. 2; Fig. 13, a broken and longitudinal sectional view of the clutch apparatus shown; Fig. 14, a transverse sectional view taken at the left side of the structure shown in Fig. 13; Fig. 15, a diagrammatic view of the wiring layout; and Fig. 16, a broken plan view of a curtain ring partially enclosed by crocheted stitches.

Broadly, the apparatus consists of a frame with crocheting mechanism mounted thereon, a collar or horn being provided for receiving the curtain ring to be crocheted. The stitching or crocheting apparatus employed is old and well known and therefore is not described in great detail in the present application. Adjacent the collar or horn for receiving the ring is a reservoir carrying a number of rings, and feeding apparatus is employed for advancing the ring to a position where it falls over the collar and is then held in fixed position during the stitching operation. A clutch mechanism is employed for starting the stitching mechanism as soon as the ring is fed onto the collar. The operating mechanism also drives a timing device which breaks the circuit after a predetermined number of stitches have been made and the ring completely sheathed thereby so that the stitching mechanism automatically stops to permit the withdrawal of the sheathed ring. The entire mechanism is operated by a single treadle. As the treadle is depressed and then released, it brings about the feeding of a ring onto the horn, the stitching operation begins, and simultaneously the timing apparatus is set into movement. After the required number of stitches have been formed on the ring, the timer breaks the circuit and the stitching mechanism stops. When the treadle is depressed again, the operator can withdraw the sheathed ring. After the ring is withdrawn, the operator releases the treadle, causing another ring to be crocheted and in the interim of time, the operator is free to tie and knot the suspension cord on the ring.

Referring more specifically to the structure shown in the drawings, A designates a frame; B, stitching mechanism; C, ring feeding mechanism; D, clutch means; and E, timing apparatus.

The frame A may be of any suitable structure. It consists of a bed 10 supported on suitable legs (not shown). Supported above the bed or base 10 is a table 11 at a convenient height for the operator. The table 11 carries a collar or horn 12 upon which the curtain ring 13 is placed for the crocheting operation.

Between the base 10 and the table 11 and partially extending thereabove is crocheting mechanism of old and well known construction. Since such mechanism is well known and since no claim is made per se to such structure in this application, a detailed description will not be given. In the general operation of this mechanism, a latch-equipped crochet needle 14 is moved back and forth through the slot 15 in the horn 12 and a rocker arm 16 is reciprocated back and forth and upwardly and downwardly carrying a thread or cord 17, the cord 17 being engaged by the crochet hook 14. By these members and other members employed below the table 11, a crocheted stitch is formed about the ring 13 and the ring is loosely rotated about the horn 12 until completely encircled by crocheted stitches.

The feed mechanism C includes a reservoir 18 and a feed bar 19 for separately advancing one ring at a time over the horn 12. The slide 19 is suitably guided upon the slotted table 11 between the slotted member 20 and the spaced members 21, as shown more clearly in Fig. 8. A stop bolt 22 is carried by the feed slide 19 and serves to limit the inner stroke of the feed slide. For advancing the slide, a link member 23 extends downwardly through the slotted table 11 and is fixed to a horizontal link 24. The horizontal link 24 is in turn secured to a lever arm 25 fixed to a treadle actuating shaft 26. Extending rearwardly from the shaft 26 is operating treadle arm 27 equipped with a depending rod 28 which is connected to a treadle (not shown) or some other suitable operating device. One end of the spring 29 is fixed to an arm 29ª, which in turn is fixed to the treadle shaft 26, and the other end of the spring 29 is fixed to a stationary standard 30 resting upon the base 10. When the treadle is pressed downwardly, the lever arm 25 is swung rearwardly to draw the feed lever 19 rearwardly. When the treadle is released, the spring 29 pulls the lever 25 forwardly and by means of the connecting links 24 and 23 causes the feed slide 19 to advance, carrying forward a ring 13 which drops by reason of gravity onto the collar 12, the slide then extending forwardly over the collar to maintain it in position on the slide during the stitching operation. The slide 19 is provided with a lateral notch 31 which coincides with the slot 15 in the collar 12.

The clutch mechanism D may be of any suitable structure. It is mounted on a main drive shaft 32. The drive shaft 32 is mounted for rotation in the bracket supports 33, 34, 35 and 36, as shown more clearly in Fig. 2. In the illustration given, the drive is by means of a belt 37, shown in broken lines in Fig. 2. The belt 37 coming from a source of power (not shown) extends about the pulley 38. The pulley 38 is keyed to the hub 39 which rotates freely upon shaft 32. The hub 39 carries a pair of collector rings 40 by which is energized a magnet 41. The magnet is provided on its forward face with a friction ring 42. A clutch member 43 is adapted to be drawn forward into engagement with the friction ring 42 to lock the driving members 38 and 39 to the shaft 32 when the magnet 41 is energized. Any suitable means for connecting the clutch member 43 to shaft 32 may be employed. In the illustration given, the member 43 is connected to a hub member 44, which, in turn, is splined to the shaft 32, as indicated in dotted lines in Fig. 13, by means of a plurality of bolts 45. Each of the bolts 45 is equipped with a spring 46 which permits the clutch member 43 to move lengthwise of the shaft 32. A friction ring 47 is provided between the member 43 and the casing member 48. The casing member 48 is secured to the fixed casing 49, as shown more clearly in Figs. 13 and 14.

The shaft 32 is provided on its rear end with a beveled gear 50 which drives another beveled gear 51 employed for operating the stitching mechanism. The other end of the drive shaft 32 is employed for operating the timer mechanism E.

The timer mechanism E may be of any suitable construction. In the illustration given, the drive shaft 32 is equipped at its forward end with a worm 52. The worm drives a horizontal worm gear 53 mounted upon the vertical shaft 54. The shaft 54 is supported by the base 10 at one end and at the other end by an angle iron support 55. The shaft 54 carries at its upper end a timer disk 56 which is equipped with insulation areas for breaking the circuit, as will be hereafter more clearly described. Three contacts 57, 58 and 59 are supported in engagement with the surface of the disk 56. A metal conducting band 60 is carried by the disk 56 for closing the circuit. The insulation blocks are indicated by the numerals 61 and 62. The insulation strips are so spaced as to break the circuit after the desired length of operation has proceeded so as to stop the operation of the stitching mechanism.

I provide a starting switch 63, as indicated more clearly in Figs. 2 and 4, the switch being closed by the forward movement of the lever arm 25 as it feeds forward one of the rings 13.

In addition, as the treadle actuating shaft 26 is rotated, a control switch 64 is rotated. The switch 64 is mounted upon a shaft 65 and carries four insulation strips 66, 66ª, 67 and 68. Contacts 69, 70 and 71 are supported in engagement with the conducting surface of the switch member 64 so as to close the circuits except when engaging said insulation areas. The switch member 64 is rotated by means of a pawl member 72 carried by means of the spacer element 72ª by the link 73, which, in turn, is fixed to shaft 26. The pawl 72 engages a ratchet 74 fixed to the switch body 64.

As an aid in the feeding of the cord or thread 17 to the stitching mechanism, I provide certain friction elements. As shown more clearly in Figs. 1, 2 and 4, the cord 17 passes first through the variable tension member 75 and thence about a roller or pulley 76 and thence through a reciprocating eye-rod 77 to the rocker bar 16. I further provide means for actuating the member 75 to vary the tension upon the cord 17. This means consists of a cam 78 carried at the forward end of the treadle shaft 26. The cam is adapted to engage the free end 79 of a lever which is pivoted upon the standard 80. The free end of the lever 79 is pivotally connected to the rod 81, as shown more clearly in Fig. 10. The upper end of the rod 81 is reduced to provide a slender rod 82 which is guided in the block or fitting 83. The upper end of the fitting 83 provides a tubular guide 84 for the rod 82. A friction disk 85 is supported above the fitting 83 and above this member is another friction disk 86 which cooperates with the member 85 in exerting friction upon the cord 17 therebetween. A spring 87 is supported between the member 86 and a nut 88 engaging the outer threaded side of the member 84. The upper disk 86 is provided with a central channel 89 which passes through a slot in the member 84 and is adapted to be engaged by the rod 82 when the same is raised. Thus, when the rod 82 is raised, it causes the upper pressure disk 86 to be moved forwardly against spring 87 so as to release the cord or thread 17 from pressure. When the treadle is pressed downwardly, the cam 78 causes the rod 82 to rise and release the thread 17 through the friction exerted by the two disks 85 and 86.

Referring to the wiring diagram shown in Fig. 15, the incoming wire 90 is shown controlled by a starter or line closing switch 63. The line 91 therefrom leads to the contact 58 in engagement with the conductive band 60 of the timer disk 56. The contact 57 is in engagement with an insulation block and therefore the line 92 in the position of the part shown carries no current. The contact 59, however, is in contact with the conductive band 60 and current therefore passes through the line 93 to the contact 71 which, because of the rotation of the switch member 64 for one stroke, will then be in contact with the conductive portion of the member 64. Current would therefore pass through line 93, contact 71, switch 64, and thence through contact 70 into line 94, and thence through the relay 95 back through the outgoing line 96. The relay 95 closes the contacts 97 and causes current to flow through the line 98 to the commutator rings 99 and thence back through line 100.

The table 11 may be equipped with a measure guide 101 to assist the operator in drawing the suspension loop of the sheathed ring to the desired length.

*Operation*

In the operation of the machine, the operator depresses the treadle rod 28. This rotates rod 26 in a clockwise movement and the lever 25 swings rearwardly. The pawl 72 drops under another tooth of the ratchet 74 in position to rotate the switch 64 at the next forward movement of the pawl. At the same time, the cam 78 carried on shaft 26 engages the lower end of the lever 79 and forces upwardly the rod 81 and the reduced rod 82, the upper end of which engages the upper pressure disk 86. Thus, the pressure is released upon the thread 17 and the operator is free to lift the finished ring from the collar 12 and draw it rearwardly to the rearmost portion of the guide 101 to produce a suspension cord of the desired length. The cord is then cut off and knotted in a well known manner.

When the treadle is released, spring 29 which engages the finger 29ᵃ causes the shaft 26 to rotate in the opposite direction. This brings the lever 25 with a forward movement, carrying the feeder slide 19 forward. The lowermost ring 13 is moved forward, the edges thereof being guided within the slotway of the reservoir C until the forward end thereof drops onto the collar 12 and thence about the collar. The slide 19 still moves forward until the slot 31 thereof is aligned with the slot 15 of the collar.

In the same forward movement just described, the pawl 72, which is in engagement with the next tooth of the ratchet 74, causes the switch 64 to be rotated one quarter of a turn. This brings contact 71, which as illustrated in Fig. 15 was formerly in contact with the insulation 67, into contact with the conductive portion of the switch. The contact 70, which constantly remains in contact with the switch, then leads the current through line 94 to a relay 95. The relay, in turn, closes the contacts 97 and current flows through line 98 to the contacts 99. Current passes through the collector rings 40, energizing the magnet 41 and back through line 100. The magnet 41 causes the clutch member 43 to move forward into engaged relation therewith, the friction disks 42 forming a tight union with the member 43. This connection causes the drive belt 37, which has been constantly rotating the pulley 38 and magnet 41, to drive the shaft 32. Shaft 32 thereupon drives through the mechanism 51 and other mechanism, and the stitching mechanism which is of well known construction. The stitching mechanism causes the thread 17 to be worked about the ring 13 on the collar 12. At the same time, the shaft 32 causes the timer disk 56 to rotate slowly until finally after the desired number of stitches have been formed on the ring, the insulation block 62 is brought into alignment with the contact 59. This breaks the circuit between line 93 and line 94. The flow of current through lines 98 and 100 is also broken and current ceases to flow through the magnet 41. The spring members 46, which had been compressed under the force of the magnet, now pull the clutch member 43 forwardly out of engagement with the friction ring 42, and the pulley member 38 and magnet member 41 then rotate without moving the drive shaft 32. The stitching mechanism thereupon ceases, and the operator steps upon the treadle, causing the slide 19 to be retracted so as to free the ring 13 now encased in stitches. The operator, while still holding down the treadle, draws forwardly the ring to the end of the measure 101 and then severs the cord, completing the usual knotting operation. In the latter movement, the thread 17 is released from the gripping disks of the member 75. When the treadle is released, the operation proceeds automatically, as has already been described, another ring being fed forward onto the collar 12, and the stitching operation and timing operation proceeding as already shown in detail. In the stitching operation, the pressure upon the disks of member 75 is constantly exerted upon the cord 17.

The apparatus is compact and sure in operation. It enables the operator by moving the one treadle member to bring about feeding of the rings, stitching thereof, and the automatic stopping of the apparatus when the desired number of stitches have been completed, while at the same time in the next treadle movement permitting the release of the cord from the friction means for the drawing of the suspension cord.

While in the foregoing specification, I have set forth certain details of structure and certain sequences in operation as desirable, it will be understood that such details and sequences may be varied by those skilled in the art without departing from the spirit of my invention.

I claim:

1. In combination with a frame equipped with a collar adapted to receive a ring and stitching mechanism for forming a sheath of stitches about said ring, a reservoir for rings, means for feeding a ring from said reservoir to said collar and simultaneously starting said stitching mechanism into operation, and means for automatically stopping said stitching mechanism after a predetermined number of stitches have been formed.

2. In combination with a frame equipped with a collar adapted to receive a ring and stitching mechanism for encasing said ring with stitches, a reservoir, means for feeding a ring from said reservoir to said collar and for maintaining said ring on said collar during the stitching operation, means for setting said stitching mechanism into operation, and means for stopping said stitching mechanism after the ring has been encased.

3. In combination with a frame equipped with a collar adapted to receive a ring and stitching mechanism for encasing said ring with stitches, a reservoir for rings, means for separately feeding rings from said reservoir onto said collar, and means for starting said stitching mechanism into operation and stopping the same after the encasing of a ring is completed.

4. In combination with a frame equipped with a collar adapted to receive a ring and crocheting mechanism for encasing the ring with crocheted stitches, a tubular casing adapted to carry a supply of rings, means for feeding a ring from said reservoir onto said collar, power means for driving said crocheting mechanism, means for setting said power means in operation to drive said crocheting mechanism, and timing mechanism driven also by said power means for rendering said power means inoperative with respect to said crocheting mechanism after a predetermined number of stitches have been formed.

5. In combination with a frame equipped with a collar adapted to receive a ring and stitching mechanism adapted to encase said ring with stitches, a reservoir for rings, means for feeding a ring from said reservoir onto said collar and for confining said ring thereon during the stitching operation, means for operating said stitching mechanism, means for stopping the operation of said stitching mechanism after the ring is encased with stitches, and means for freeing said ring encased with stitches to permit its removal from said collar.

6. In combination with a casing equipped with a collar adapted to receive a ring and stitching mechanism for encasing said ring with stitches, a reservoir for rings, a manually-operated element, means operated by said manually-operated element for feeding a ring onto said collar and simultaneously setting said stitching mechanism into operation, and timing mechanism operable after a predetermined number of stitches have been formed for stopping the operation of said stitching mechanism.

7. In combination with a frame equipped with a collar adapted to receive a ring and stitching mechanism adapted to encase said ring with stitches, means for feeding a ring onto said collar, means for operating said stitching mechanism, means for exerting tension upon the thread fed to said stitching mechanism, means for automatically stopping the operation of said stitching mechanism after the ring has become encased with stitches, and means for releasing the tension upon said thread after the stitching operation is completed.

8. In combination with a frame equipped with a collar adapted to receive an object to be encased with stitches, stitching mechanism adapted to form said stitches about said object, means for feeding a ring upon said collar, means for driving said stitching mechanism, means for starting said stitching mechanism into operation immediately after the feeding of said ring, and control mechanism operable after a predetermined number of stitches have been formed for stopping the operation of said stitching mechanism.

9. In combination with a frame equipped with a collar adapted to receive an object and stitching mechanism for encasing said object with stitches, means for feeding said object onto said collar, means for exerting tension upon the thread fed to said stitching mechanism, means for automatically stopping the operation of said stitching mechanism after said object is encased with stitches, and means for releasing the tension upon said thread to permit the removal of said object.

10. In combination with a frame equipped with a collar adapted to receive an object to be encased with stitches, stitching mechanism for forming stitches on said object, means for feeding said object onto said collar, a manually-operated element, means operated by said manually-operated element for starting said stitching mechanism simultaneously with the feeding of said object onto said collar, and control mechanism operable after a predetermined number of stitches have been formed for stopping said stitching mechanism.

11. In combination with a platform equipped with a collar adapted to receive a ring and stitching mechanism adapted to encase said ring with stitches, a treadle-operated control shaft, a reservoir for rings, means operated by said control shaft for feeding a ring onto said collar and simultaneously starting said stitching mechanism into operation, friction means engaging the thread fed to said stitching mechanism, means for stopping said stitching mechanism after a predetermined number of stitches have been formed, and means operated by said control shaft for releasing the friction upon said thread to permit the removal of said encased ring from said collar.

12. In combination with a frame equipped with a collar adapted to receive a ring, said collar being slotted on one side, and stitch-forming mechanism adapted to extend through said slot and form stitches about said collar, a tubular reservoir supported adjacent said collar and containing rings, a slide member adapted to engage the lowermost ring and to feed it upon said collar and then to extend over said ring to retain it upon said collar during the stitching operation, said slide being provided with a slot aligned with the slot of said collar when in said ring-retaining position, and means for operating said stitching mechanism.

13. In combination with a frame equipped with a collar adapted to receive a ring and stitching mechanism for forming stitches on said ring, means for feeding a ring upon said collar, a drive shaft for operating said stitching mechanism and also for operating a stitch control mechanism, driven means revolving freely about said shaft and provided with means adapted to be energized to form a magnet, clutch means engaging said drive shaft and adapted to be connected to said driven means when said magnet is energized, a manually-operable element, a switch controlled thereby for causing current to flow to said magnet, and means operated by said switch control mechanism after a predetermined number of revolutions of said drive shaft for breaking the circuit, leaving said magnet to disconnect said driven member from said shaft.

14. In combination with a frame equipped with a collar adapted to receive a ring, a crocheting mechanism adapted to encase said ring with stitches, a manually-operable lever, a reservoir for rings, means operated by said lever for feeding a ring onto said collar, a drive shaft connected to said crocheting mechanism, a driven element freely rotatable thereon, clutch means controlled by said lever for connecting said driven means to said shaft, and control means also driven by said shaft for releasing said clutch from said driven means after a predetermined number of revolutions of said shaft.

WALTER A. HERRMANN.